United States Patent [19]
Douglas

[11] 3,744,386
[45] July 10, 1973

[54] FILM ADVANCING APPARATUS

[75] Inventor: Lawrence M. Douglas, Eastondale, Mass.

[73] Assignee: Polaroid Corporation, Cambridge, Mass.

[22] Filed: Oct. 4, 1971

[21] Appl. No.: 186,032

[52] U.S. Cl. .............................. 95/11 R, 95/31 FM
[51] Int. Cl. .......................................... G03b 19/02
[58] Field of Search.................... 95/11, 13, 31 FM; 355/3

[56] References Cited
UNITED STATES PATENTS

| | | | |
|---|---|---|---|
| 3,405,617 | 10/1968 | Land et al. | 95/13 |
| 3,289,558 | 12/1966 | Wareham | 95/13 |
| 2,591,417 | 4/1952 | Frye | 95/31 R |
| 3,106,142 | 10/1963 | Peterson | 95/31 R |
| 3,505,943 | 4/1970 | Bellows | 95/13 X |
| 3,484,163 | 12/1969 | Eichorn et al. | 355/3 |

*Primary Examiner*—Samuel S. Matthews
*Assistant Examiner*—Kenneth C. Hutchison
*Attorney*—Alfred E. Corrigan, Robert F. Peck et al.

[57] ABSTRACT

Photographic apparatus including first and second housing sections connected to each other to define sides of the apparatus. The first housing section includes a chamber for receiving a film cassette and a pair of rollers mounted adjacent one end of the chamber. The film cassette houses a plurality of film units, each of which includes superposed photosensitive and image-receiving elements and a container of processing liquid attached near leading ends of the elements. A lever having a film-engaging member at one end and a hand-engageable portion at the other end is pivotally connected to the second housing section in a manner which allows the film-engaging member to swing through an arc which carries it into the film cassette's exposure aperture to engage the forwardmost film unit therein and advance it into the bite of the rollers. The rollers are driven by a battery operated motor having an open switch in the circuit between the two. The switch is maintained in an open position by a cam which is located in position to be engaged and rotated by the film unit as it moves from the cassette toward the rollers for allowing the switch to close, thereby initiating operation of the rollers. The rollers are stopped due to movement of the film unit out of engagement with the cam while the trailing end of the film unit is still located in the bite of the rollers, thereby releasably retaining the film unit in the bite of the rollers until removed by the user.

12 Claims, 4 Drawing Figures

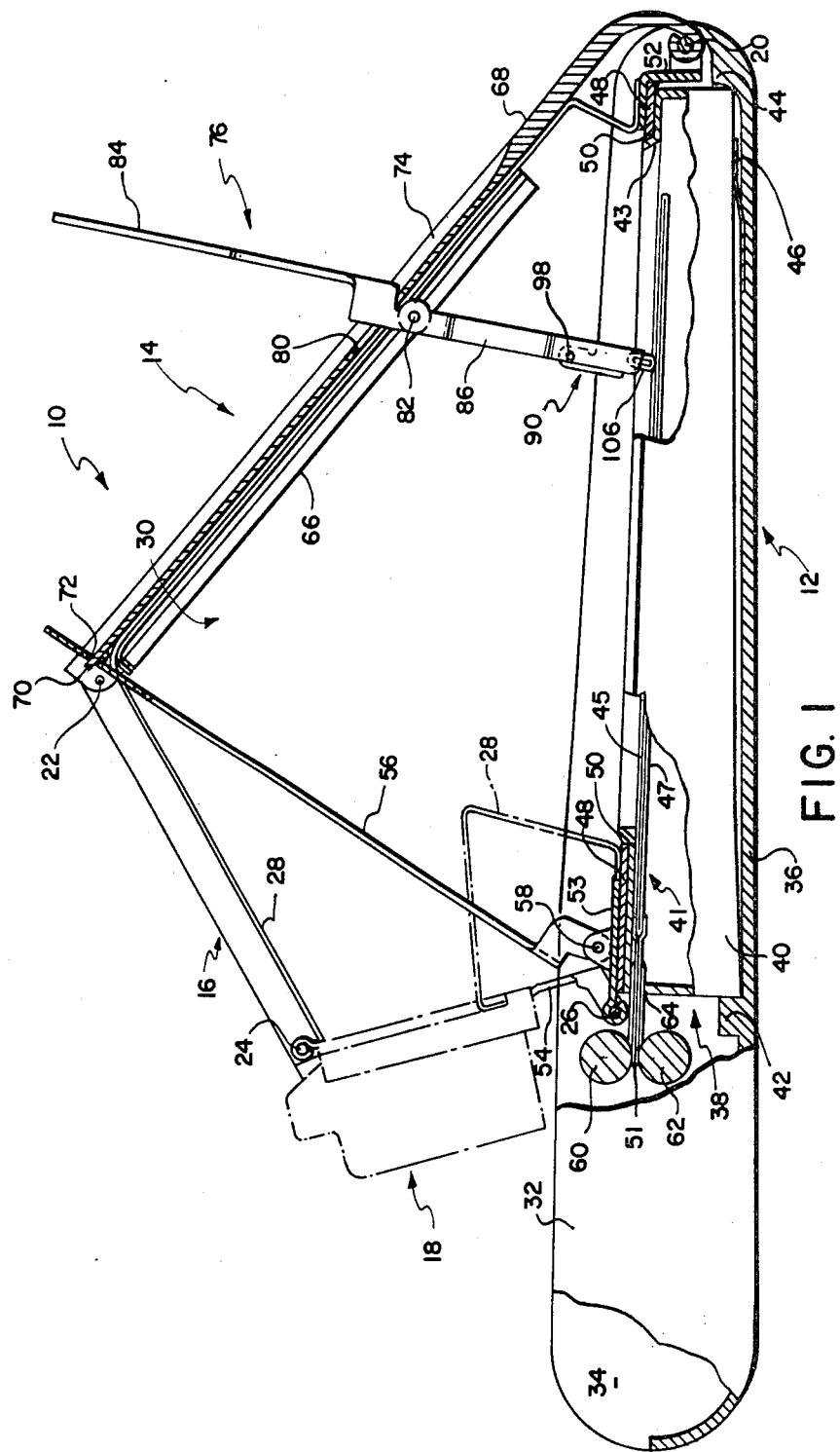

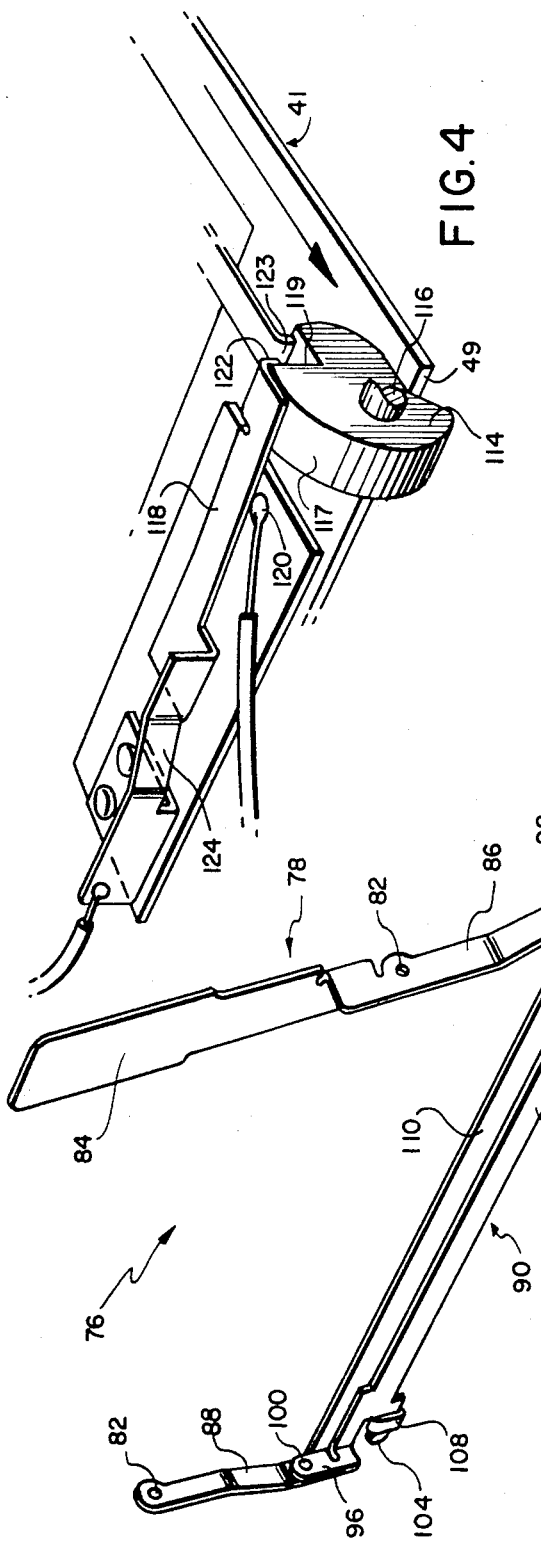
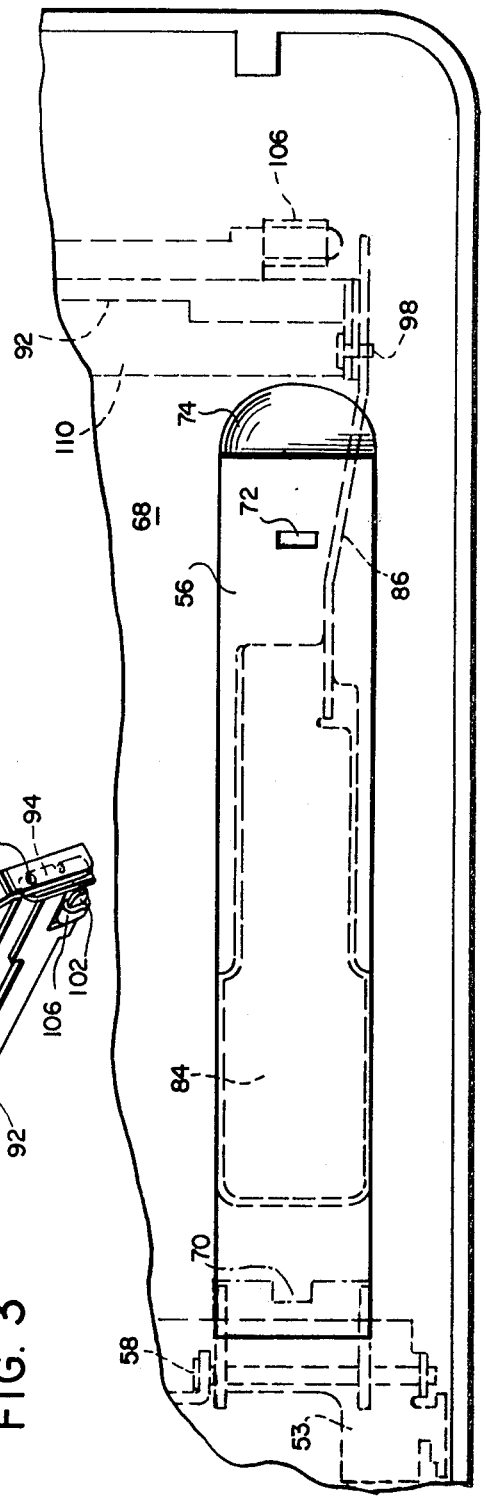

FILM ADVANCING APPARATUS

BACKGROUND OF THE INVENTION

1. Field of the Invention

This invention relates to photographic film-advancing apparatus.

2. Description of the Prior Art

One of the basic components of may photographic apparatus, e.g., cameras, is a film-advancing system which is adapted to engage an exposed film unit and move it out of its exposure position to enable subsequent film units to be located in position for exposure. In past years, these systems generally included a crank or knob mounted on the exterior of the camera which was adapted to be manually actuated to advance the exposed film unit. An objection to having a portion of the film-advancing system or apparatus mounted exteriorly of the camera was that it provided the camera with a non-streamline configuration. Several camera designers obviated this problem by mounting the film-advancing apparatus wholly within the camera and providing it with an automatic drive. However, today the emphasis is on compactness as well as a smooth, streamline configuration. Therefore, today's designer is faced with the problem of how to provide a camera with a film-advancing system which will not detract from the stream-line configuration of the camera and yet will occupy a minimum of space within he small volume available within a compact camera.

SUMMARY OF THE INVENTION

The present invention relates to photographic apparatus and more particularly to a camera including a film-advancing system. The camera includes first and second housing sections. The first housing section includes a chamber for receiving and locating a film cassette in position for exposure of the forwardmost film unit located therein and a pair of pressure-applying members, e.g., rollers, located adjacent an end of the chamber and adapted to receive a film unit as it is moved out of the cassette subsequent to exposure. The second housing section provides a supporting structure for a film-advancing system including a lever pivotally mounted intermediate its ends to the second housing section. The film-advancing system includes a film-engaging member pivotally coupled to one end of the lever and a hand engageable portion located at the opposite end of the lever. The lever is adapted to be moved between a first position in which the hand engageable portion of the lever is located in a recess in an exterior surface of the second housing section and the remainder of the system lies adjacent an interior wall of the second housing section, and a second position in which the film-engaging member is moved through an arc and into an opening in the film cassette to frictionally engage and move the forwardmost film unit, subsequent to exposure, out of the cassette and into the bite of the rollers. The pivotal connection between the film-engaging member and the lever cooperates with a flange or stop extending from the lever to allow the film-engaging member to pivot relative to the lever in the direction of rotation of the lever as it moves from its first or inoperative position to its second or operative position while limiting relative rotational movement therebetween in the opposite direction. This arrangement allows (1) the rollers to advance the film unit while it is still in contact with the film-engaging member without the latter damaging the film unit due to the friction generated by the relative movement between the film unit and the film-engaging member and (2) the lever to be pivoted from the operative position to the inoperative position without moving a film unit in a direction away from the rollers. A cam actuated electrical switch is mounted in the path of movement of the film unit from the cassette toward the rollers. The cam is adapted to be engaged by the film unit and rotated to a position which allows the switch to close prior to the film unit entering the bite of the rollers. Closure of the switch electrically couples the roller's motor with a battery, thereby insuring that the rollers are rotating prior to receiving the film unit. The rollers continue to be driven by the motor until the film unit moves out of engagement with the cam. Upon disengagement of the film unit from the cam, the latter moves to a position in which it opens the switch, thereby de-energizing the motor and stopping rotation of the rollers. The point at which this disengagement takes place is selected such that the rollers will be stopped while the trailing end of the film unit is still in the bite of the rollers, thereby releasably retaining the film unit in the bite until it can be removed by the user at his convenience. The film-advancing system is equally well suited for use with a photographic apparatus of either the non-folding or folding type in that with the non-folding type of photographic apparatus it does not change the basic configuration of the apparatus while, with photographic apparatus of the compact folding type, the compactness of the film-advancing system is extremely compatible with the minimum of space available when in the folded configuration.

An object of the invention is to provide photographic apparatus with a film-advancing system which utilizes a minimum of space and does not materially increase the size or configuration of the apparatus.

Another object of the invention is to provide photographic apparatus which utilizes the movement of a film unit for initiating operation of pressure-applying means prior to the film unit being moved into engagement therewith by film-advancing means.

Another object of the invention is to provide film-advancing means which is equally well compatible with folding or non-folding types of photographic apparatus.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is an elevational view, partly in section of photographic apparatus embodying the instant invention;

FIG. 2 is an enlarged fragmentary view of the apparatus in a folded position with an erecting link shown overlying a portion of the apparatus' film-advancing system;

FIG. 3 is a perspective view of the film-advancing system; and

FIG. 4 is an enlarged perspective view of a cam operated switch.

DETAILED DESCRIPTION OF THE INVENTION

Reference is now made to FIG. 1 of the drawings wherein is shown photographic apparatus in the form of a camera 10. Camera 10, which is preferably of the compact, folding type but may be of the non-folding type, includes first, second, third and fourth housing sections 12, 14, 16 and 18, respectively, pivotally coupled at 20, 22, 24 and 26 for movement between an extended operative position as shown in FIG. 1 and a folded, compact position wherein the camera assumes a generally parallelepipedonal configuration. A flexible bellows 28, made from any suitable opaque material, is attached at its lower end to an inner frame positioned within housing section 12 and to housing sections 14 and 18. Bellows 28 defines an exposure chamber 30 for directing light admitted into the chamber by a shutter and lens assembly mounted in fourth housing section 18 toward a film unit located in position for exposure within first housing section 12.

Housing section 12 includes a pair of side walls 32 and 34 connected to each other by a wall 36 to define three sides of a U-shaped chamber 38 adapted to receive a film cassette 40. Wall 36 is provided with a pair of laterally extending, longitudinally spaced ribs 42 and 44 which provide a means for locating the film cassette 40 in position for exposure of the foremost film unit 41 located therein, and a pair of resiliently mounted contacts 46 (only one of which is shown). Contacts 46 are adapted to extend into apertures in a rear wall of film cassette 40 to make electrical contact with a battery located therein for operating various components of the camera, and to urge the film cassette upwardly (as viewed in FIG. 1). Mounted within the confines of first housing section 12 is an inner frame comprising a sheet 48 of resilient material; e.g., spring steel, having a generally rectangular shaped opening 50, an angle bracket 52 having one leg secured to sheet 48 and its other leg attached to pivot 20, and a support plate 53 secured to the end of sheet 48 opposite to that at which the angle bracket 52 is secured. Support plate 53 pivotally supports a pair of shutter housing brackets 54 (only one of which is shown) about hinge 26 and one end of an erecting link 56 about a hinge 58. Pressure-applying members, e.g., rollers 60 and 62, are suitably supported by wall 36 and extend across an open end of the chamber 38 in position to receive a film unit 41 as it is moved out of cassette 40 via opening 64.

Second housing section 14 includes means (not shown) for mounting a reflecting surface, e.g., a mirror 66, in position to receive light from the lens and shutter assembly in housing section 18 and redirect it towards housing section 12 and film unit 41. An exterior surface 68 of housing section 14 is provided with a tang 70 which is adapted to be located in an aperture 72 in erecting link 56 for maintaining the housing sections of the camera in an erect condition. Erecting link 56 is resiliently biased by suitable means in a clockwise direction as viewed in FIG. 1 and may be disengaged from housing section 14 by rotating link 56 in a counterclockwise direction until tang 70 moves out of aperture 72. Housing section 14 is first rotated in a counterclockwise direction and then the erecting link 56 is rotated in a clockwise direction until the camera is folded and erecting link 56 lies on top of housing section 14.

Exterior surface 68 also includes a recess 74 for receiving a portion of the camera's film-advancing system and the erecting link 56, as will be more fully explained hereinafter.

Camera 10 is provided with film-advancing means for moving a film unit 41, subsequent to exposure, from cassette 40 into the bite of rollers 60 and 62. The film-advancing means includes a generally U-shaped member 76, having a leg 78 which extends through an aperture 80 in housing section 14. Aperture 80 is provided with means (not shown) for preventing the passage of light therethrough. U-shaped member 76 is provided with a pair of laterally spaced apertures 82 for pivotally coupling it to an interior surface of housing section 14. Leg 78 includes a first portion 84 which functions as an actuating means and is adapted to be grasped by the user and rotated in a clockwise direction to move a film unit out of the exposure position shown in FIG. 1 and a second portion 86 which extends into the camera and cooperates with leg 88 to pivotally carry film-engaging means 90. Film-engaging means 90 includes a transverse member 92 having brackets 94 and 96 attached at each end thereof. Brackets 94 and 96 are pivoted to legs 78 and 88 by pins 98 and 100, respectively, and spring means (not shown) are provided for resiliently biasing member 92 in a counterclockwise direction, as viewed in FIG. 3. Transverse member 92 includes a pair of oppositely facing, laterally spaced, fingers 102 and 104 on which are mounted film-engaging members 106 and 108. Film-engaging members 106 and 108 are adapted to frictionally engage the foremost film unit in cassette 40 and accordingly are made of any suitable material having a high coefficient of friction, e.g., rubber or plastic. Also extending between legs 78 and 88 is a flange 110 which functions as a stop to limit rotation of transverse member 92 in a counterclockwise direction, as will be more fully explained hereinafter.

OPERATION

The camera is adapted to receive a film cassette in either the folded or extended position. To insert a fresh cassette into the camera, the user uncouples a latch (not shown) between housing section 12 and inner frame member 48 and rotates housing section 12 in a counterclockwise direction about hinge 20 to a position wherein a film cassette 40 can be inserted between ribs 42 and 44 in chamber 38. Housing section 12 is then rotated in a clockwise direction until it is again latched to inner frame 48. As can be seen in FIG. 1, ribs 42 and 44 locate the film cassette such that an endless rib 43 on cassette 40, which defines a generally rectangular exposure aperture, is guided into alignment with aperture 50 in inner frame 48, thereby properly locating film unit 41 in position for exposure.

If the camera is of the folding type, the user moves the various housing sections to the erect position shown in FIG. 1 by first pivoting erecting link 56 in a counterclockwise direction until housing section 14 can be rotated to the position shown in FIG. 1 without interference from erecting link 56. Housing section 14 is then rotated in a clockwise direction until housing sections 14, 16 and 18 assume the position shown in FIG. 1. At this time tang 70 on housing section 14 enters aperture 72 in erecting link 56 (erecting link 56 being biased in a clockwise direction by suitable spring means) to maintain the various housing sections in the erect or operative position.

After the scene to be photographed is properly focused, the user actuates the camera's shutter release, thereby allowing the lens and shutter to admit light from the scene to be directed into exposure chamber 30. The lens directs the light toward mirror 66 which redirects it through the transparent image-receiving element 45 of film unit 41 and onto the photosensitive element 47. The exposed film unit is then moved out of the exposure position and toward rollers 60 and 62 by actuating the film-advancing means 76; i.e., the user grasps portion 84 of leg 78 and rotates it in a clockwise direction from a first position in which the film-advancing means lies in a plane substantially parallel with a plane containing housing section 14 to a second position (see FIG. 1) wherein the film-engaging members 106 and 108 extend into the cassette's exposure aperture and frictionally engage and move the exposed film unit toward rollers 60 and 62.

As the exposed film unit 41 is moved by the film-advancing means through slot 64 in cassette 40, the leading end 49 of the film unit (see FIG. 4) engages a cam 114 pivotally mounted at 116 to the camera structure at a position between slot 64 and rollers 60 and 62 and rotates the cam in a clockwise direction. Cam 114 is configured such that the aforementioned clockwise rotation thereof will move surface 117 of cam 114 in a direction to allow a resilient contact member 118 to move downwardly under its own bias until it engages a contact 120 to complete an electrical circuit between the battery located in the cassette and the motor (not shown) for driving the rollers 60 and 62. Cam 114 also includes a second surface 119 which engages a flange 122 on contact member 118 to flex member 118 in a counterclockwise direction about a vertical section 124 of member 118 during the aforementioned clockwise rotation of cam 114, thereby providing a source of energy for rotating cam 114 back to the position shown in FIG. 4 upon film unit 41 moving out of engagement with the cam. Stated another way, clockwise rotation of cam 114 results in contact member 118 being (1) displaced in a counterclockwise manner due to the engagement between surface 119 and flange 122 and (2) allowed to move toward contact member 120 under the influence of its own bias. The exposed film unit is then moved into the bite of the rotating rollers 60 and 62. Rollers 60 and 62 continue to advance the film unit toward the exterior of the camera while simultaneously rupturing a container 51 of processing liquid and spreading its contents between the elements 45 and 47 to initiate a diffusion transfer process which ultimately results in a positive image. It should be noted that the rollers 60 and 62 may advance the exposed film unit while it is still in engagement with the film-advancing means without any resulting relative movement between the film unit and the film-engaging members 106 and 108 causing damage to the film unit. Specifically, relative movement between the film unit and the film-engaging members 106 and 108 will cause transverse member 92 to rotate about pins 98 and 100 in a clockwise manner, thereby decreasing the frictional engagement between the film unit and the film-engaging members. Pins 98 and 100 also provide a means for decreasing the frictional engagement between the film-engaging means or members 106 and 108 and the next succeeding film unit to be positioned for exposure as the film-advancing means moves from the aforementioned second position to the first position, thereby preventing damage to the next succeeding film unit by being jammed against the cassette's trailing end wall (to the right in FIG. 1).

The exposed film unit continues to be advanced by the motor driven rollers 60 and 62 toward the exterior of the camera until the trailing end of the film unit (the end opposite to that at which container 51 is located) moves out of engagement with cam 114. As soon as the trailing end of the film unit moves out of engagement with cam 114, resilient contact member 118 and its flange 122 will automatically rotate in a clockwise direction to rotate cam 114 in a counterclockwise direction until cam 114 assumes the position shown in FIG. 4. A stop 123 is provided for limiting counterclockwise rotation of cam 114. During this latter rotation of cam 114, the high point on cam 114, which is located at the intersection of cam surfaces 117 and 119, will deflect contact member 118 upwardly out of electrical engagement with contact 120 to open the electrical circuit to the motor, thereby stopping rotation of rollers 60 and 62. The point at which the exposed film unit is moved out of engagement with the cam is selected such that the rollers will be stopped while the trailing end of the film unit is still frictionally retained in the bite of the rollers. This feature allows the user of the camera to remove the exposed film unit from the bite of the rollers at his convenience rather than catching the film unit as it is propelled by the rollers toward the exterior of the camera.

After the film-advancing means has been manually actuated to move the exposed film unit into the bite of the rollers, actuating portion 84 of leg 78 may be released and the film-advancing means will be returned to its first or non-operative position by suitable means, e.g., a spring. As note hereinbefore, portion 84, which is the only component of the film-advancing means which extends exteriorly of the camera, is located wholly within recess 74 in housing section 14 when the film-advancing means is in the first position, thereby preserving the existing configuration of the camera when the film-advancing means is not in use. The various housing sections may then be moved to return the camera to its compact, folded position wherein the first and second housing sections 12 and 14 and the film-advancing means lie in generally parallel planes. Erecting link 56 may then be rotated in a clockwise direction until it lies in recess 74 on top of actuating portion 84 and forms a continuation of exterior surface 68 of housing section 14.

From the foregoing it can be seen that there has been disclosed a novel, inexpensive and highly reliable film-advancing apparatus which is adapted for use with cameras of either the folding or non-folding type. The apparatus occupies a minimum of space and is adapted to blend in with the present configuration of a camera when the apparatus is in the non-operative position, thereby preserving the existing lines of the camera.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising:

a first housing section including means for locating a film cassette in position for exposure of one of a plurality of film units contained therein;

a second housing section coupled to said first housing section;

film-advancing means including a lever pivotally coupled intermediate its ends to said second housing section, said film-advancing means further including film-engaging means mounted near one end of said lever extending into said apparatus and actuating means at the other end of said lever extending outwardly of said apparatus; and means pivotally coupling said film-advancing means to said second housing section for pivotal movement between a first position wherein said film-advancing means lies substantially flush with said second housing section and a second position wherein said film-engaging means extends away from said second housing section and into said film cassette and engages said one film unit for moving said one film unit out of said exposure position.

2. Photographic apparatus as defined in claim 1 further including pivot means coupling said first and second housing sections for movement between an extended position wherein they define sides of an angle and a compact, folded position wherein said first and second housing sections and said film-advancing means lie in generally parallel planes.

3. Photographic apparatus as defined in claim 1 wherein said second housing section includes means defining a recess for receiving said actuating means when the latter is in said first position.

4. Photographic apparatus as defined in claim 1 wherein said film-engaging means includes means for frictionally engaging said film unit as said film unit is moved out of said exposure position.

5. Photographic apparatus as defined in claim 4 wherein said film-advancing means includes means for decreasing the frictional engagement between said film-engaging means and a succeeding film unit as said film-advancing means moves from said second position toward said first position.

6. Photographic apparatus as defined in claim 1 wherein said film cassette includes an exposure aperture and said film-engaging means is mounted for movement into said exposure aperture to engage said one film unit as said film-advancing means moves into said second position.

7. Photographic apparatus as defined in claim 6 wherein said film-engaging means engages said one film unit at laterally spaced locations.

8. Photographic apparatus as defined in claim 1 further including pressure-applying means mounted in position to receive said one film unit and adapted to continue its movement toward the exterior of said apparatus, said film-engaging means being maintained in frictional engagement with said one film unit until said one film unit is advanced by said pressure-applying means.

9. Photographic apparatus as defined in claim 8 wherein said film-advancing means includes means for decreasing the frictional engagement between said film-engaging means and said one film unit as said one film unit is advanced by said pressure-applying means.

10. Photographic apparatus comprising:

a first housing section including means for locating a film cassette in position for exposure of one of a plurality of film units contained therein;

a second housing section coupled to said first housing section;

film-advancing means pivotally coupled to said second housing section, said film-advancing means including film-engaging means extending into said apparatus and actuating means extending outwardly of said apparatus;

means pivotally coupling said film-advancing means to said second housing section for movement between a first position wherein said film-advancing means is substantially in alignment with said second housing section and a second position wherein said film-engaging means extends away from said second housing section and into said film cassette and engages said one film unit for moving said one film unit out of said exposure position;

pressure-applying means mounted in position to receive said one film unit as it is moved out of said exposure position and continue its movement toward the exterior of said apparatus;

drive means for driving said pressure-applying means; and means engageable by said one film unit as it is moved out of said exposure position for closing an electrical circuit to said drive means to initiate operation of said pressure-applying means prior to receiving said one film unit.

11. Photographic apparatus as defined in claim 10 wherein said engageable means is adapted to open said electrical circuit to terminate operation of said pressure-applying means upon said one film unit moving out of engagement with said engageable means.

12. Photographic apparatus as defined in claim 11 wherein said pressure-applying means includes a pair of rollers and said engageable means is adapted to terminate operation of said rollers while a trailing end portion of said one film unit is in the bite of the rollers, thereby releasably retaining said one film unit.

* * * * *